United States Patent
Seneviratne et al.

(10) Patent No.: US 11,836,865 B2
(45) Date of Patent: Dec. 5, 2023

(54) SYSTEMS AND METHODS FOR AUGMENTED REALITY VISUAL INSPECTIONS

(71) Applicant: Wichita State University, Wichita, KS (US)

(72) Inventors: Waruna Seneviratne, Wichita, KS (US); John Tomblin, Wichita, KS (US); Christopher Pini, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 0 days.

(21) Appl. No.: 17/448,005

(22) Filed: Sep. 17, 2021

(65) Prior Publication Data

US 2022/0092858 A1 Mar. 24, 2022

Related U.S. Application Data

(60) Provisional application No. 63/080,435, filed on Sep. 18, 2020.

(51) Int. Cl.
| | |
|---|---|
| *G06T 19/00* | (2011.01) |
| *G06T 7/33* | (2017.01) |
| *G06F 16/22* | (2019.01) |
| *G06F 3/14* | (2006.01) |

(52) U.S. Cl.
CPC .............. *G06T 19/006* (2013.01); *G06F 3/14* (2013.01); *G06F 16/22* (2019.01); *G06T 7/33* (2017.01)

(58) Field of Classification Search
None
See application file for complete search history.

(56) References Cited

U.S. PATENT DOCUMENTS

| | | | | |
|---|---|---|---|---|
| 2014/0168258 A1* | 6/2014 | Dearman | ............... | G06T 11/60 345/632 |
| 2015/0170159 A1* | 6/2015 | Wada | ..................... | G06Q 10/06 235/375 |
| 2020/0202419 A1* | 6/2020 | Beauchamp | ....... | G06Q 30/0641 |

FOREIGN PATENT DOCUMENTS

KR 102207719 * 1/2021

OTHER PUBLICATIONS

Kim et al. ( KR 102207719 machine translation Date: Jan. 2021) (Year: 2021).*

* cited by examiner

*Primary Examiner* — Tapas Mazumder
(74) *Attorney, Agent, or Firm* — Stinson LLP

(57) ABSTRACT

An augmented reality visualization system is disclosed for viewing non-destructive inspection (NDI) data of a component. The system comprises a component camera configured to capture a real time image of the component, a component display configured to display an AR image of the component, and an AR controller including an augmented reality processor and a non-transitory tangible storage medium. The storage medium includes processor-executable instructions for controlling the AR processor when the instructions are executed by the AR processor. The instructions access the NDI data of the component and implement a component AR engine to generate the AR image in real time by overlaying the NDI data on the real time image. The AR engine is configured to detect one or more three-dimensional (3D) features of the component in the real-time image and generate the AR image based on the detected one or more features.

19 Claims, 7 Drawing Sheets
(5 of 7 Drawing Sheet(s) Filed in Color)

SYSTEMS AND METHODS FOR AUGMENTED REALITY VISUAL INSPECTIONS

CROSS-REFERENCE TO RELATED APPLICATION

The present application claims priority to the U.S. Provisional Patent Application No. 63/080,435 filed on Sep. 18, 2020, which is hereby incorporated by reference.

FIELD

The present disclosure generally relates to component inspections, and more specifically, to systems and methods for using augmented reality to perform component inspections.

BACKGROUND

Non-destructive testing includes a variety of different techniques to collect data about a component or specimen without damaging it. These testing techniques allow inspectors to inspect structural characteristics of the component that may not be visibly apparent. Moreover, non-destructive testing can typically be performed without damaging the component in order to keep the component in use or service after the inspection is complete. Common nondestructive testing techniques include ultrasonic testing, tomography, shearography, radiography (e.g., x-ray, CT), acoustic testing, magnetic testing, eddy current (electromagnetic) testing, liquid penetrant testing, leak testing, etc. Each non-destructive testing technique may have its own respective non-destructive inspection systems to perform the testing. These non-destructive testing systems produce non-destructive inspection data from the testing which is then analyzed by an inspector.

Non-destructive testing is performed in a variety of different fields and industries such as aerospace, oil & gas, power generation, chemicals, automotive, maritime, mining, etc. For example, non-destructive testing can be performed in aircraft manufacture and maintenance, infrastructure (e.g., roads, bridges, overpasses, etc.) maintenance, and gas supply (e.g., tanks, gas lines, etc.) maintenance.

SUMMARY

In one aspect, an augmented reality (AR) visualization system for viewing non-destructive inspection (NDI) data of a component is disclosed. The system comprises a component camera configured to capture a real time image of the component, a component display configured to display an augmented reality image of the component, and an AR controller. The AR controller includes an augmented reality processor and a non-transitory tangible storage medium including processor-executable instructions for controlling the AR processor. When the instructions are executed by the AR processor, the instructions include instructions to access the NDI data of the component and to implement a component AR engine to generate the AR image in real time by overlaying the NDI data on the real time image. The AR engine is configured to detect one or more three-dimensional (3D) features of the component in the real-time image and generate the AR image based on the detected one or more features.

In another aspect, a computer implemented method for viewing non-destructive inspection data of a component in real time is disclosed. The method comprises capturing, by a component camera, a real time image of the component, accessing the non-destructive inspection data of the component, detecting one or more three-dimensional (3D) features of the component in the real-time image, generating an AR image based on the detected one or more 3D features in real time by overlaying the non-destructive inspection data on the real time image, and displaying, by a component display, the AR image.

In another aspect, a method of remotely inspecting a component for certification is disclosed. The method comprises capturing, by a component camera of an AR visualizer, a real time image of the component, generating an augmented reality image using the AR visualizer in real time by overlaying NDI data on the real time image, transmitting the AR image in real time to a remote user interface, the remote user interface disposed at a location that is remote of the AR visualizer, and displaying, with the remote user interface, the AR image.

Other objects and features of the present disclosure will be in part apparent and in part pointed out herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding parts throughout the drawings.

DETAILED DESCRIPTION

Figure 1:
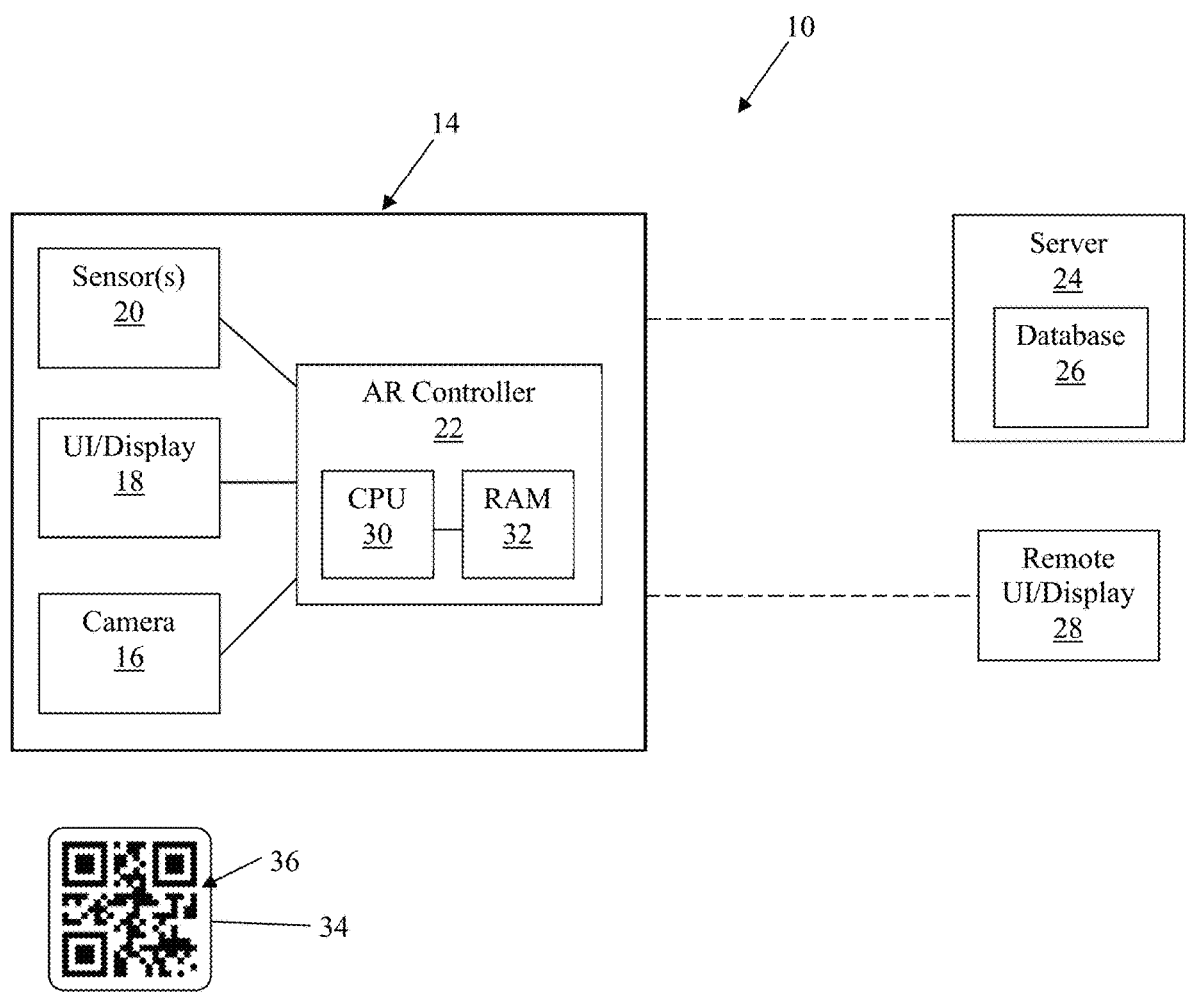
FIG. 1 is a schematic of an augmented reality visualization system according to one embodiment of the present disclosure.

Referring to FIG. 1, an augmented reality (AR) visualization system for viewing non-destructive inspection (NDI) data of a component or specimen C, generally indicated at reference numeral 10, is disclosed. The system 10 is used to generate an augmented reality image of the component C that contains non-destructive inspection data in order to inspect the component. The overlay of the non-destructive inspection data on a real time image of the component C allows for live viewing and interaction of the NDI data by the inspector during inspection. The inspector is able to freely move, walk around and visualize the component C and to analyze the non-destructive inspection data in real time in reference to the physical component. This makes it easier for the inspector to conceptualize the non-destructive inspection data in real space (e.g., on the component C), thereby improving the inspection process by making it easier to inspect the component. In one method of use, the AR visualization system 10 is used to view non-destructive inspection data of an aircraft component such as a wing. It is understood that the AR visualization system 10 can be used with any component having non-destructive inspection data associated therewith, such as roads, bridges, overpasses, tanks, gas lines, etc.

FIG. 1 discloses the AR visualization system 10 further comprising a server 24, a remote interface 28, an identification tag 34, and an AR visualizer 14. The AR visualizer 14 is a hardware and software solution configured to generate and display an AR image 40 of the component C to a user or inspector. The AR image 40 of the component C includes a real time image 42 (e.g., a digital photo image) of C that is overlaid with NDI data 44, as shown in further detail in FIG. 2. Accordingly, the AR image 40 of the component C generally comprised the NDI data 44 overlaid onto the real time image 42 of the component. The AR visualizer 14 further includes a component camera 16, a user interface 18, one or more sensors 20, and an AR controller 22. The camera 16, user interface 18, and sensors 20 are communicatively coupled to the AR controller 22 either with a wireless connection or a wired connection. The component camera 16 is configured to capture the real time image 42 of the component C. The user interface 18 can be configured as a display screen to display the AR image 40 of the component C. An input device (e.g., buttons, not shown) is configured to receive user input in order to control various components and systems of the AR visualizer 14. In the illustrated embodiment, the display and input device are integral with one another, i.e., the user interface 18 is a touch screen, although other types of user interfaces are within the scope of the present disclosure. The sensors 20 of the AR visualizer 14 can include one or more of an accelerometer, a gyroscope, a compass, a proximity sensor, etc., and provide positions and/or orientation information of the AR visualizer used to generate the AR image 40.

The AR visualizer 14 further comprises a component AR engine configured to generate the AR image 40 and an AR controller, the AR engine broadly being a software program. The AR engine is implemented by the AR controller 22 to generate the AR image 40. In the illustrated embodiment, the AR visualizer 14 is preferably a portable or hand-held computer such as tablet computer, a cell phone, a laptop computer, or any other suitable device. The component camera 16, user interface 18, sensors 20, and AR controller 22 are housed together in a single device in the illustrated embodiment, however other embodiments in which the elements are separate and discrete are within the scope of the present disclosure. For example, in another embodiment, the component camera 16 is separate and discrete from the other elements of the AR visualizer 14. In this embodiment, the component camera 16 may be moved around the component C (i.e., carried by an unmanned aerial vehicle or drone) to capture the real time image 42 of the component separate from the rest of the AR visualizer 14.

The server 24 of the is configured to store NDI data 44 of the component C on a NDI database 26. The AR controller 22 is communicatively coupled to the server 24 to access the NDI data 44 stored on the NDI database 26 through either a wired or wireless connection. The NDI database 26 may store a plurality of different NDI records for a plurality of different components, where each NDI record corresponds to a single component C. Each NDI record includes NDI data 44 for the particular component C to which it corresponds, as well as other information. The server 24 is preferably a remote server, however the NDI database may also be stored on the AR controller 22.

The NDI data 44 may be configured to be in the form of an image (i.e., picture or video). The types of NDI data 44 that would be included in the NDI record can include ultrasonic data, tomography data (i.e., computerized tomography (CT) data) shearography data, radiography data (i.e., x-ray), acoustic data, etc. It is understood that this disclosure is not limited to creating AR images based on NDI data 44 and that any kind of visual data can be used by the AR visualization system 10 to create an AR image. In addition, the NDI record can include spatial data or information representative of the component C. The spatial data represents one or more spatial or three-dimensional (3D) features of the component C. The spatial data may include surface data representative of the one or more surfaces of the component C. The spatial data may include dimensions (e.g., height, length, width) of the component C and elements or surfaces thereof, point image data, cloud point data, etc. For example, the spatial data may include a 3D computer model of the component C. In one embodiment, the spatial data may be a 3D scan of the component C. The NDI data 44 is mapped or otherwise associated with the spatial data. For example, the NDI data 44 for one surface of the component is mapped onto the surface data of the spatial data representative of the one surface components. This links the NDI data 44 to the 3D geometry of the component C and is used to marry the NDI data 44 to the real time image.

The NDI data 44 is created using conventional NDI systems and techniques. After the NDI data 44 is created, the NDI data 44 is stored in the NDI database 26 as part of the NDI record for the component C. The spatial data may also be created using conventional 3D scanning systems and techniques and stored in the NDI database as part of the NDI record for the component C. When the NDI data 44 is stored in the NDI database 26, the user maps the NDI data to the spatial data. The user maps the NDI data 44 directly to a face or plane of the spatial data. The user can selectively link the NDI data 44 (and portions thereof) directly to a face or plane of the spatial data, so that the NDI data will appear on that face or plane of the component C, as described further below.

In one embodiment of the present disclosure, the remote user interface 28 of the AR visualization system 10 is the same user interface as the user interface 18. However, in the illustrated embodiment of FIG. 1, the remote user interface 28 is a different user interface than the user interface 18. The remote user interface 28 can be configured as a television, computer, cell phone, tablet computer, laptop computer, or any other suitable device. The AR controller 22 is communicatively coupled to the remote user interface 28 either through a wired or wireless connection. The remote user interface 28 is configured to display the AR image 40 of a component C. The remote user interface 28 includes a component display to display the AR image 40 either simultaneously with the user interface 18 or alternatively to the user interface. The remote user interface 28 is configured to be located in a location remote from the AR visualizer 14, i.e., the AR visualizer may be in one location and the remote user interface may be in another location. Thus the AR visualizer system 10 can be used to enable an inspector to inspect the component C without having to travel to the location of the component. The AR visualizer system 10 can allow one person (i.e., a technician) to operate the AR visualizer 14 to generate the AR image 40 while simultaneously enabling an inspector to view the AR image, via the remote user interface 28, without having to be physically present with the component C. For example, the inspector can inspect the component C from his/her office while the technician operates the AR visualizer 14 at the site where the component C is located.

The identification tag 34 of the AR visualization system 10 further includes an identifier corresponding to the component C. For example, in the illustrated embodiment, the identifier is a machine-readable identification marking 36 in the form of a QR code. Other examples of identifiers include serial numbers or other machine-readable identification markings or graphics representing the identifier of the component C. The machine-readable identification marking 36 may be a linear (e.g., one dimensional) barcode, a matrix barcode (e.g., a two dimensional barcode, a quick response (QR) code) or the like. The component camera 16 is configured to read or scan the machine-readable identification marking 36 to obtain the identifier of the component C. Once the identifier of the component C is acquired by the AR visualizer 14, the AR visualizer can access the corresponding NDI record and NDI data 44 associated with the component. For example, the NDI record storing the NDI data 44 corresponding to the component C can be located in the NDI database 26 using the identifier of the component from the identification tag 34. In another embodiment, the user may enter the identifier of the component C manually using the user interface 18.

The AR controller 22 of the AR visualizer 14 further includes a CPU or processor 30 and RAM or memory 32 (e.g., non-transitory computer-readable storage medium). The processor 30 provides the computing engine that drives the operation of the AR visualizer 14, while the memory 32 includes processor-executable instruction for controlling the operation of the processor. The instructions embody one or more of the functional aspects of the AR visualizer 14, with the processor 30 executing the instructions to perform said one or more functional aspects. For example, the component AR engine is embodied in one or more processor-executable instructions. In one aspect of the present disclosure, the component AR engine is embodied on the memory 32 of the AR controller 22 and is executed by the processor 30. In general, the AR visualizations system 10 includes computer executable instructions that, when executed by the processor 30, configure the processor to implement the component AR engine to generate the AR image 40. As described further below, the component AR engine uses input from the component camera 16, the sensors 20, and the server 24 to generate and output the AR image 40 to the user interface 18 and/or the remote user interface 28.

Figure 2:
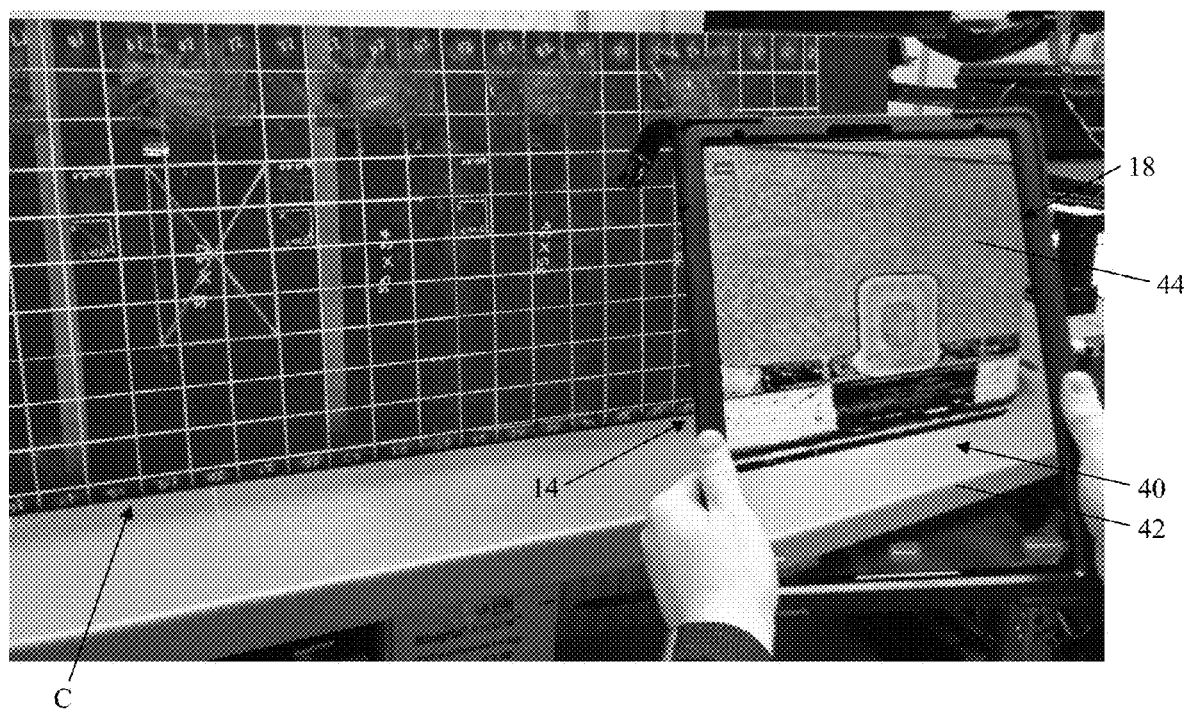
FIG. 2 is a photograph of a component being inspected with an AR visualizer of the AR visualization system, the AR visualizer displaying an ultrasonic AR image of the component.

Referring to FIG. 2, the AR controller is configured to access the NDI data 44 of the component C. The AR controller 22 uses the identifier obtained from the identification tag 34 or manually entered by the user to locate and access the NDI record containing the NDI data 44 corresponding to the component C. For example, the user may move the AR visualizer 14 to position the identification tag 34 in view of the component camera 16, which then captures an image of the machine-readable identification marking 36. The AR controller 22 analyses the image the image to read the machine-readable identification marking 36 to obtain the identifier. The AR controller 22 communicates with the server 24 to locate the NDI data corresponding to the component C in the NDI database 26 using the identifier. The obtained identifier is matched to the NDI record in the NDI database 26 corresponding to the component C. In one embodiment, the AR visualizer 14 retrieves (i.e. downloads) the corresponding NDI data 44 from the server 24 for use by the component AR engine. In another embodiment, the NDI database 26 may be stored in the memory 32 of the AR controller 22 and the AR controller uses the identifier to access the correct NDI data 44 in the database.

Figure 3:
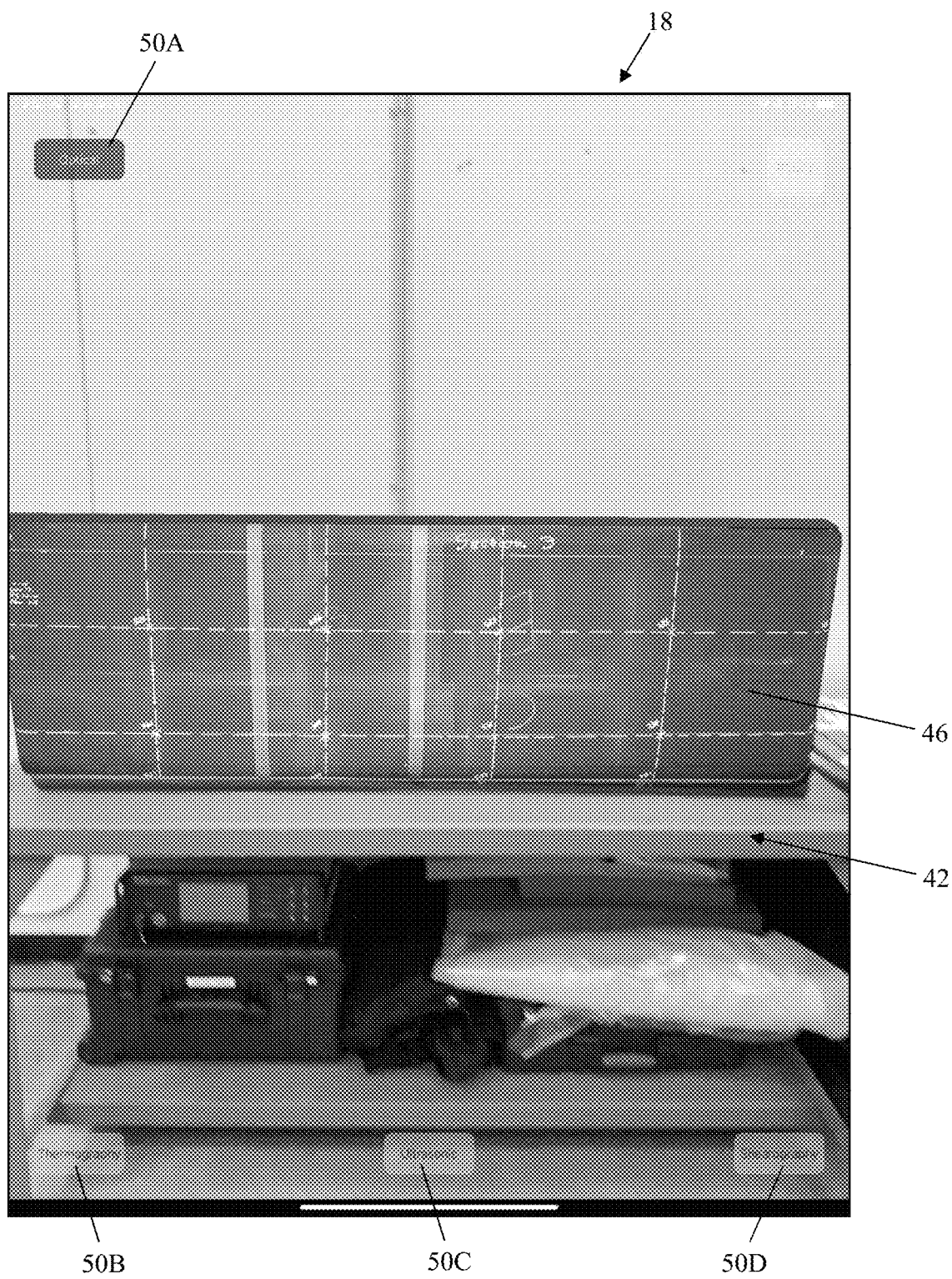
FIG. 3 is a photograph of user interface of the AR visualizer showing an optical image of the component.
Figure 4:
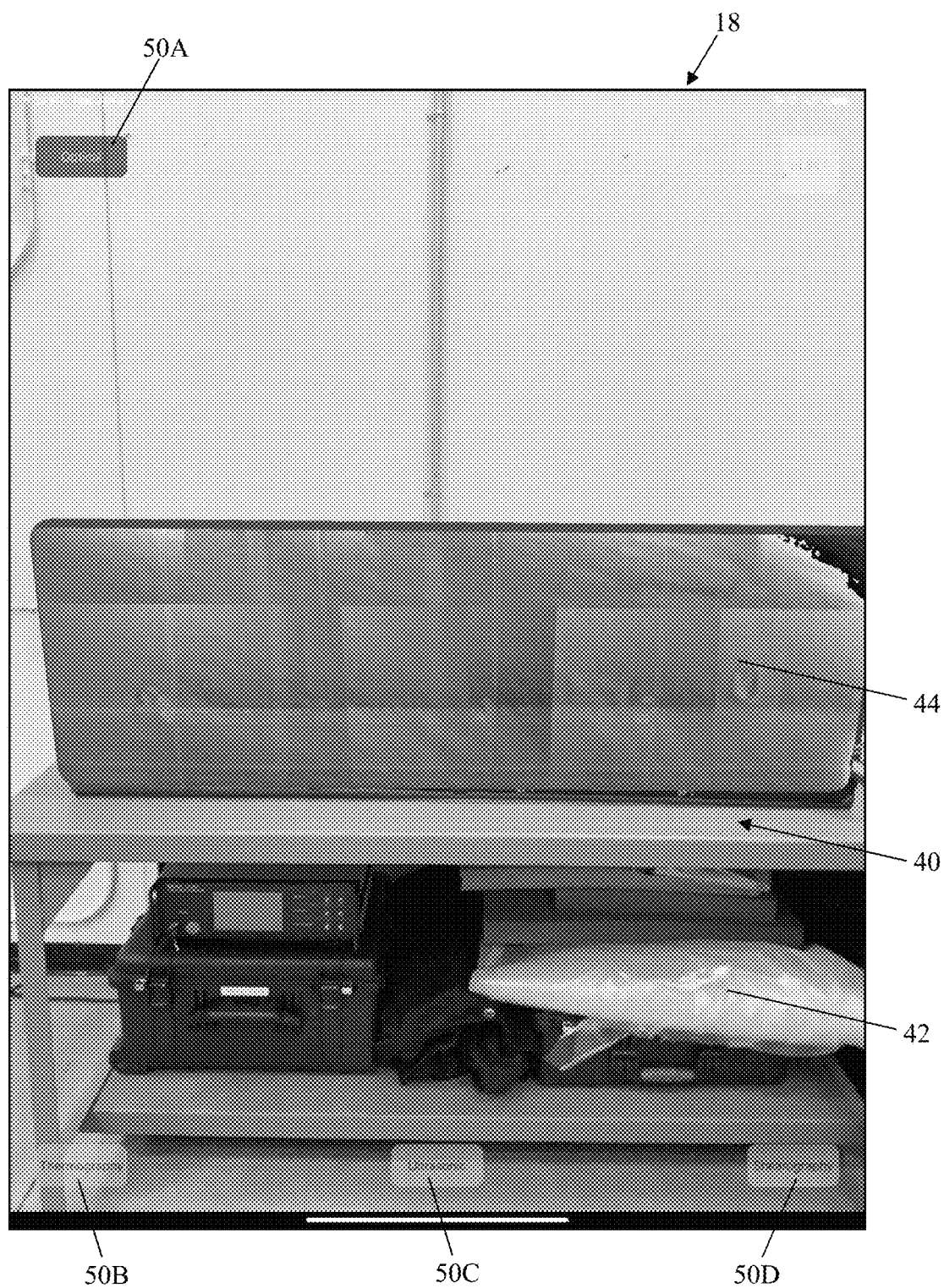
FIG. 4 is a photograph of a user interface of the AR visualizer showing a shearography AR image of the component.
Figure 5:
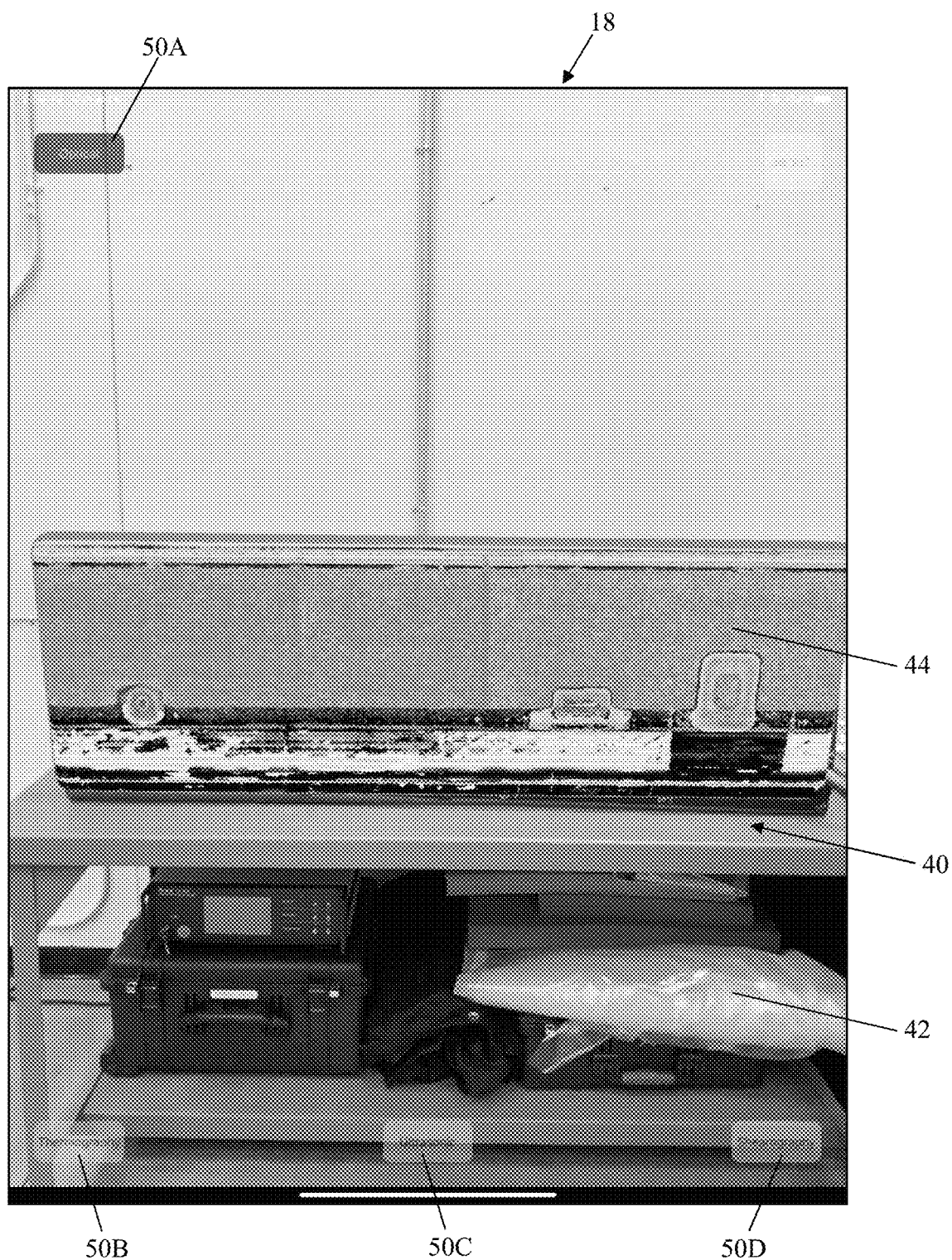
FIG. 5 is a photograph of the user interface showing an ultrasonic AT image of the component.
Figure 6:
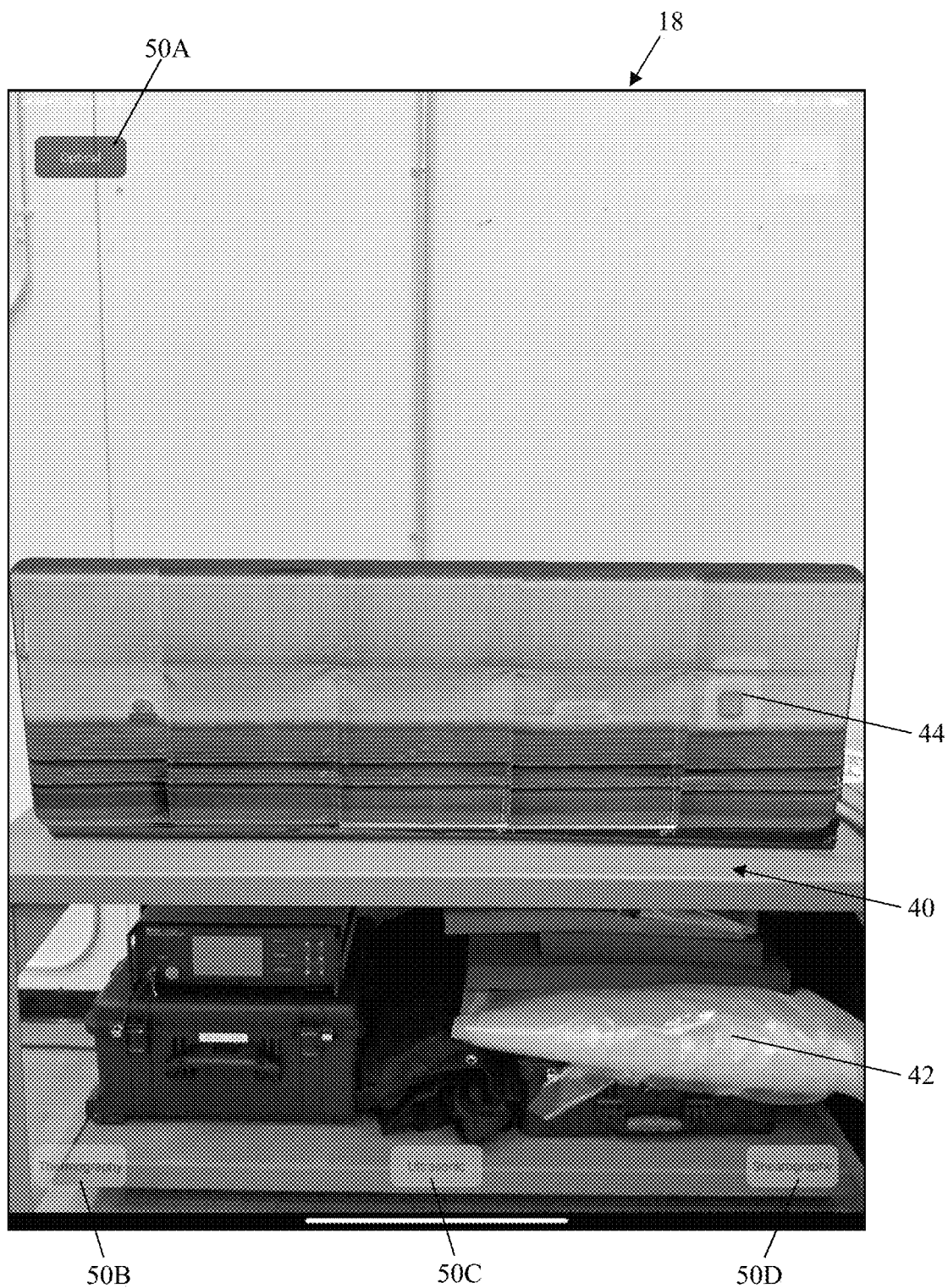
FIG. 6 is a photograph of a user interface showing a thermographic AT image of the component.

Referring to FIG. 3-6, the component AR engine, implemented by the AR controller 22, is configured (e.g., comprises instructions) to generate the AR image 40 in real time by overlaying the NDI data 44 on the real time image 42 obtained by the component camera 16. The AR image 40 generated by the component AR engine contains the NDI data 44 associated with a displayed portion 46 of the component C. The displayed portion 46 of the component C is the portion of the component that is visible in the frame of the real time image 42 captured by the component camera 16 and displayed by the user interface 18. The component AR engine is configured to determine the displayed portion 46 of the component C in the real time image 42 and to overlay only the NDI data 44 for the displayed portion. The displayed portion 46 of the component C can be the entire component if the entire component is in the frame of the real time image 42 or only a portion of the component if only a portion is shown in the real time image 42. In other words, the AR image 40 generated by the component AR engine only overlays the NDI data 44 corresponding the to the displayed portion 46 of the component C contained in the real time image 42. For example, if only a portion of the component C (e.g., only a portion of a surface thereof) is in the real time image 42, then only the portion of the NDI data 44 corresponding to the in frame portion of the component is overlaid to create the AR image 40 (FIG. 2). However, if the entire component C (e.g., an entire surface thereof) is in the real time image 42, then the entire portion of the NDI data 44 for the component is overlaid to create the AR image 40 (FIGS. 4-6).

The component AR engine is further configured to marry the NDI data 44 to the real time image 42 so that the NDI data that overlays the real time image is aligned with the displayed portion 46 of the component C in the real time image. The AR engine is configured to detect one or more three-dimensional (3D) features of the component C in the real time image 42 and to generate the AR image 40 based on the detected one or more 3D features. The 3D features can include edges, surfaces, corners, contours, colors, etc. (broadly, visual gradients). By detecting one or more 3D features of the component C in the real time image 42, the component AR engine is able to establish reference points within the real time image. The component AR engine uses these reference points to orient and align the NDI data 44 to the displayed portion 46 of the real time image 42. The component AR engine matches the detected 3D features of the component C to the corresponding spatial features in the spatial data to orient and align the NDI data 44 mapped onto the spatial data with the displayed portion 46 in the real time image 42. Accordingly, since the NDI data 44 is mapped to the spatial data, the spatial data is the key used to link the NDI data to the displayed portion 46 of the component C in the real time image 42.

In one embodiment, the AR visualization system 10 may include one or more reference markers (not shown) disposed at specific locations on the component C and viewable by the AR visualizer 14. Further, the spatial data may include reference marker data representing the spatial or 3D location of the reference marker on the component C. In this embodiment, the component AR engine is configured to use the reference marker and reference marker data to orient and align the NDI data 44 to the displayed portion 46 of the real time image 42. The component AR engine may use the reference marker and reference marker data in addition to or instead of 3D features of the component C.

The component AR engine is configured to determine, based on the detected one or more 3D features of the component C, which of the NDI data 44 corresponds to the displayed portion 46 of the real time image 42. As mentioned above, the component AR engine is configured to only overly the NDI data 44 that corresponds to the displayed portion 46 of the component in the real time image 42. By detecting one or more 3D features of the component C and matching the detected features with the spatial data, the component AR engine is able to determine the NDI data 44 that corresponds to the displayed portion 46 of the real time image 42. The component AR engine then selects and overlays the corresponding NDI data 44 onto the real time image 42 to create the AR image 40.

After the component AR engine selects the NDI data 44 corresponding to the displayed portion 46, the component AR engine is configured to transform the selected NDI data in order to orient and align the NDI data with the displayed portion in the real time image 42. Transforming the NDI data 44 may include one or more of scaling, rotating, skewing, distorting, and/or warping. By transforming the NDI data 44, the component AR engine is creating a perspective of the NDI data 44 that matches the perspective of the displayed portion 46 of the component C in the real time image 42. To transform the NDI data 44, the component AR engine compares the spatial data to the displayed portion 46. In one embodiment, the component AR engine may transform the spatial data (or determine how the spatial data needs to be transformed) so that the one or more spatial features align with the one or more 3D features of the displayed portion 46 of the component C and then transform the NDI data 44 in the same way the spatial data was transformed. Other ways of transforming the NDI data are within the scope of the present disclosure. After the NDI data 44 is transformed, the selected and transformed NDI data can be overlaid on the displayed portion 46 of the real time image 42 to create the AR image 40.

The component AR engine generates the AR image 40 in real time. The component AR engine also continuously updates the AR image 40 in real time, to keep the AR image current. For example, as the user moves the AR visualizer 14 relative to the component C, the view of the displayed portion 46 in the real time image 42 changes. The component AR engine, using the processes described herein, updates the selected and transformed NDI data 44 that is overlaid on the real time image 42 to update the AR image 40, thereby keeping the AR image current to the perspective viewed and shown by the AR visualizer 14. Accordingly, the component AR engine generally conducts a closed loop process or routine to generate and then continuously update the AR image 40 to keep the NDI data 44 overlaid with the displayed portion 46 of the real time image 42 as the angle of the component camera 16 changes with respect to the component C. As the orientation and/or position of the AR visualizer 14/component camera 16 changes relative to the component C, the AR image 40 is updated or changed in real time to correspond to the real time image 42 of the component. In addition, the component AR engine uses the signals or inputs from the sensors 20 to help generate and update the AR image 40. For example, the component AR engine can use the sensors 20 to track the change in orientation and/or position of the AR visualizer 14 relative to the component C to facilitate the updating of the AR image 40. This information from the sensors 20 may be useful if some of the 3D features of the component C are no longer in the frame of the real time image 42 and/or to continually re-calibrate the component AR engine to ensure the NDI data 44 is aligned with the displayed portion in the real time image. The component AR engine may include conventional programs and frameworks to facilitate the real time generation and updating of the AR image 40 such as an AR framework, a machine learning framework, and/or a rendering framework. Other configurations of the component AR engine are within the scope of the present disclosure.

In the illustrated embodiment, the user interface 18 and/or the remote user interface 28 are touch screens, including both a user input and a display. The display shows the AR image 40 to the user after the AR image is generated by the component AR engine. The user input comprises touch sensitive areas of the display. In the illustrated embodiment, the user interface 18 includes touch sensitive buttons to allow the user to switch between the different AR images 40 showing the different types of NDI data 44 for the component C. For example, the user interface 18 includes an optical button 50A, a thermography button 50B, an ultrasonic button 50C, and a shearography button 50D. When the user presses the optical button 50A (e.g., no NDI data 44 is shown), the real time image 42 of the component C is displayed, as shown in FIG. 3. When the user presses the thermography button 50B, the AR image 40 showing the thermography NDI data 44 is displayed, as shown in FIG. 4. When the user presses the ultrasonic button 50C, the AR image 40 showing the ultrasonic NDI data 44 is displayed, as shown in FIG. 5. When the user presses the shearography button 50D, the AR image 40 showing the shearography NDI data 44 is displayed, as shown in FIG. 6. The user interface 18 may include other buttons corresponding to other types of NDI data as well.

The user interface 18 may also be configured to permit the user to mark up and/or annotate the displayed AR image 40. For example, the user can draw on the touch sensitive display of the user interface 18 to annotate the displayed AR image 40. Preferably, the annotations and/or mark ups are correlated to the NDI data 44 so that the annotations and/or mark ups will stay with their corresponding NDI data 44 even as the AR image 40 is updated for the AR visualizer's movement relative to the component C. For example, the AR controller 22 can be configured to cast a ray to the spatial data from the annotation to link or place that annotation at a specific corresponding location on the component C. The user interface 18 is configured to recognize the annotation (e.g., touch) point on the display and then the AR controller 22 correlates the annotation point to a specific location in the spatial data. This allows the annotation to be linked to a specific point in the spatial data of component C and can be shown when the specific point is in the displayed portion 46 of the real time image 42. The annotations and mark ups can also be saved to the NDI database 26 as part of the NDI record for that component, to be accessed later. Other ways of annotating or marking up the AR image 40 are within the scope of the present disclosure. It is understood that the remote user interface 28 may have the same features as user interface 18.

Figure 7:
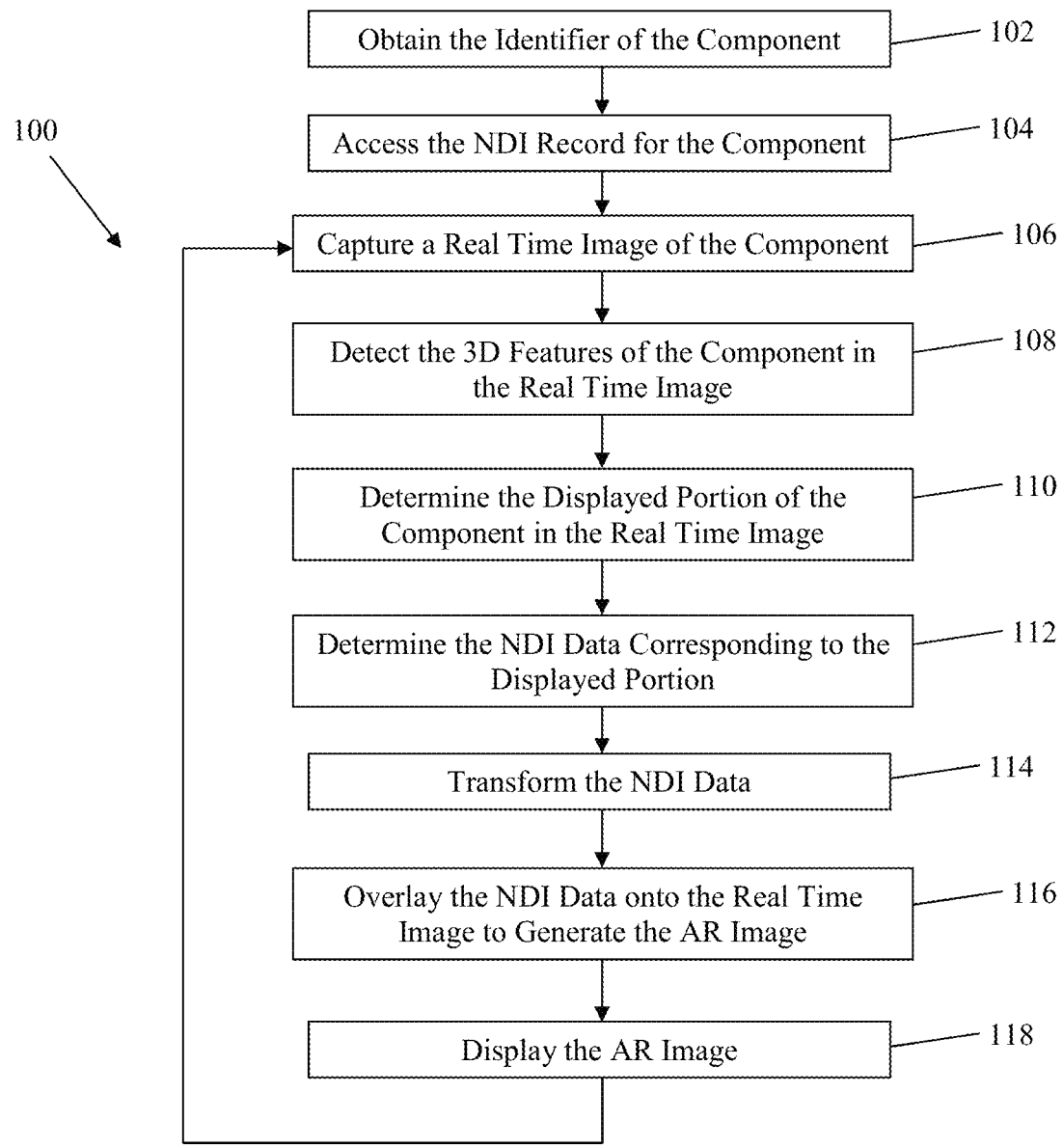
FIG. 7 is a flow diagram illustrating a method for generating the AR image according to one embodiment of the present disclosure.

Referring to FIG. 7, a method of using the AR visualization system 10 is generally indicated at reference numeral 100 and will be briefly described. The method includes capturing, by a component camera 16, a real time image of the component. At step 102, the method comprises the AR visualization system 10 obtaining an identifier of the component C for which an AR image 40 will be generated. The method could comprise of either the user inputting a component identifier manually using either a user interface 18 or a remote user interface 28, or by scanning and reading an identification tag 34 associated with the component C using a component camera 16 of an AR visualizer 14. At step 104, the method comprises an AR controller 22 accessing a NDI record for NDI data 44 and spatial data for the component C. The AR visualizer 14 uses the identifier to locate the NDI record corresponding to the component C in a NDI database 26. In one embodiment, the method comprises the AR visualizer 14 retrieving (e.g., downloading) the NDI record from the server 24. In an alternative embodiment, the method comprises steps 102 and 104 operating in a loop to allow the user to retrieve any number of NDI records at generally the same time. For example, the AR visualizer 14 may continuously look for identification tags 34 to scan and download the associated NDI record once an identification tag is scanned. Once all the NDI records are downloaded, the user can end the loop using the user interface 18.

After the NDI record is accessed, the method comprises the AR visualizer 14 generating the AR image 40. The user orients the AR visualizer 14 so that the component camera 16 is pointed toward the component C. At step 106, the method comprises the component camera 16 capturing a real time image 42 of the component C. The method then comprises, at step 108, the component AR engine analyzing the real time image 42 and detecting the one or more 3D features of the component C in the real time image 42. The entire component C may be in the frame of the real time image 42 or, if needed, the user may move the component camera 16 as needed to scan or show the entire component C to the AR visualizer 14. At step 110, the method comprises a component AR engine determining the displayed portion 46 of the component C in the real time image 42. The component AR engine matches the detected 3D features in the real time image 42 to corresponding spatial features in the spatial data to orient and align the NDI data 44 with the displayed portion 46 in the real time image. Moreover, at step 112, the method comprises the component AR engine using the detected 3D features to determine which of the NDI data 44 corresponds to the displayed portion 46 in the frame of the real time image 42. At step 114, the method further comprises the component AR engine selecting and transforming the NDI data corresponding to the displayed portion 46. Further, the method comprises the component AR engine comparing the spatial data representative of one or more spatial features of the component to the displayed 46 and overlaying the selected and scaled NDI data 44 to have the same perspective as the perspective of the displayed portion in the real time image 42. At step 116, the method further comprises generating an AR image 40 based on the detected one or more 3D features in real time by overlaying the transformed NDI data 44 on the real time image 42 to create the AR image 40. The component AR engine arranges the transformed NDI data 44 on the displayed portion 46 of the real time image 42 by aligning the spatial features to the detected 3D features. Once the component AR engine has generated the AR image 40, at step 118 the method comprises displaying the AR image 40 on the user interface 18 (and/or user interface 28) which displays the AR image. Steps 106-118 are repeated in a loop to continuously update the AR image 40 while the AR visualizer 14 is displaying the AR image. For example, as the user moves the AR visualizer 14 about the component C, steps 106-118 are repeated to continuously update the AR image 40 to accommodate the new orientation and/or position of the AR visualizer and component camera 16 relative to the component C and keep the NDI data 44 aligned the displayed portion 46 of the real time image 42.

A method of remotely inspecting a component C for certification will now be briefly described. The method comprises capturing, by a component camera 16 of an AR visualizer 14, a real time image 42 of the component C. The real time image 42 can be of a portion of the component C or the entire component C, based on how much of the component is within the view of the component camera 16. Next, the method comprises generating an augmented reality image 40 using the AR visualizer 14 in real time by overlaying NDI data 44 on the real time image 40. The AR visualizer is configured to display either a portion of the NDI data 44 corresponding to a portion of the component C that is captured by the component camera 16, or to display the entire NDI data corresponding to the entire component C captured by the component camera. The method then comprises transmitting the AR image 40 in real time to a remote user interface 28, the remote user interface disposed at a location that is remote of the AR visualizer 14. Next, the method comprises displaying, with the remote user interface 28, the AR image 40 at the remote location for inspection by a user.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

In view of the above, it will be seen that several advantageous results are obtained.

Having described the disclosure in detail, it will be apparent that modifications and variations are possible without departing from the scope of the disclosure defined in the appended claims.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained. As various changes could be made in the above constructions and methods without departing from the scope of the disclosure, it is intended that all matter contained in the above description and shown in the accompanying drawings shall be interpreted as illustrative and not in a limiting sense.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. An augmented reality visualization system for viewing non-destructive inspection data of a component, the system comprising:
a component camera configured to capture a real time image of the component;
a component display configured to display an augmented reality image of the component;
a non-destructive inspection database storing the non-destructive inspection data and a 3D computer model representative of the component, the non-destructive inspection data being mapped to a 3D computer model in the non-destructive inspection database; and
an augmented reality controller including an augmented reality processor and a non-transitory tangible storage medium including processor-executable instructions for controlling the augmented reality processor when the instructions are executed by the augmented reality processor, the instructions including instructions to access the non-destructive inspection data of the component and to implement a component augmented reality engine to generate the augmented reality image in real time by overlaying the non-destructive inspection data on the real time image, the augmented reality engine being configured to detect one or more three-dimensional (3D) features of the component in the real-time image, match the one or more 3D features to the 3D computer model to orient and align the non-destructive inspection data in relation to the real time image, and generate the augmented reality image such that the augmented reality image includes the non-destructive inspection data oriented and aligned on the real time image based on the matching of the detected one or more 3D features to the 3D computer model.

2. The augmented reality visualization system as set forth in claim 1, wherein the component augmented reality engine is configured to determine a displayed portion of the component in the real time image and to overlay only the non-destructive inspection data for the displayed portion.

3. The augmented reality visualization system as set forth in claim 2, wherein the component augmented reality engine is configured to determine, based on the detected one or more 3D features, which of the non-destructive inspection data corresponds to the displayed portion.

4. The augmented reality visualization system as set forth in claim 3, wherein the component augmented reality engine is configured to select and transform the non-destructive inspection data corresponding to the displayed portion by comparing the 3D computer model to the displayed portion before overlaying the non-destructive inspection data on the displayed portion to create the augmented reality image.

5. The augmented reality visualization system as set forth in claim 1, further comprising a machine-readable identification marking visibly associated with the component, and wherein the instructions to access the non-destructive inspection data include instructions to read the machine-readable identification marking in the real time image and to determine a non-destructive inspection record for the component based on the machine-readable identification marking in the real time image, the non-destructive inspection record including the non-destructive inspection data of the component.

6. The augmented reality visualization system as set forth in claim 5, further comprising a non-destructive inspection database storing a plurality of non-destructive inspection records for a plurality of different components, including the non-destructive inspection record for the component.

7. The augmented reality visualization system as set forth in claim 6, further comprising a remote server storing the non-destructive inspection database, the augmented reality controller communicatively coupled to the remote server.

8. The augmented reality visualization system as set forth in claim 1, wherein the non-destructive inspection data includes a plurality of types of non-destructive inspection data for the component.

9. The augmented reality visualization system as set forth in claim 8, further comprising a user interface including a user input and a display, the user interface including a non-destructive inspection data selector configured to receive user inputs selecting the type of non-destructive inspection data for the component that is displayed in the augmented reality image.

10. The augmented reality visualization system as set forth in claim 8, wherein the types of non-destructive inspection data include at least two of thermography data, ultrasonic data, and shearography data.

11. A computer implemented method for viewing non-destructive testing inspection data of a component in real time, the method comprising:
    mapping the non-destructive inspection data to a 3D computer model of the component containing a plurality of 3D features;
    capturing, by a component camera, a real time image of the component; accessing the non-destructive inspection data of the component;
    detecting one or more three-dimensional (3D) features of the component in the real-time image, matching the one or more 3D features in the real time image to the 3D features in the 3D computer model of the component, and using the one or more 3D features as one or more reference points for orienting and aligning the non-destructive inspection data in relation to the real time image;
    generating an augmented reality image based on the detected one or more 3D features in real time by overlaying the non-destructive inspection data on the real time image such that the augmented reality image includes the non-destructive inspection data oriented and aligned on the real time image based on said matching the one or more 3D features in the real time image to the 3D features in the 3D computer model of the component; and
    displaying, by a component display, the augmented reality image.

12. The method of claim 11, wherein generating the augmented reality image includes determining a displayed portion of the component in the real time image and overlaying the non-destructive inspection data for the displayed portion.

13. The method of claim 12, wherein generating the augmented reality image includes determining, based on the detected one or more 3D features, which of the non-destructive inspection data corresponds to the displayed portion.

14. The method of claim 13, wherein generating the augmented reality image includes selecting and transforming the non-destructive inspection data corresponding to the displayed portion by comparing spatial information representative of one or more spatial features of the component to the displayed portion and overlaying the selected and scaled non-destructive inspection data on the displayed portion.

15. The method of claim 11, wherein accessing the non-destructive inspection data includes reading a machine-readable identification marking in the real time image and retrieving the non-destructive inspection data from a non-destructive inspection database based on the machine-readable identification markings in the real time image.

16. The method of claim 11, further comprising receiving a selection of at least one type of non-destructive inspection data from among a plurality of types of non-destructive inspection data stored in a non-destructive inspection database, and in response the selection, displaying the at least one type of non-destructive inspection data on the component display.

17. The method of claim 16, wherein the types of non-destructive inspection data include at least two of thermography data, ultrasonic data, and shearography data.

18. The method of claim 11, further comprising receiving a mark up of the augmented reality image, linking the mark up to a corresponding location in the 3D computer model, and storing the mark up with a non-destructive inspection record for the component.

19. A method of remotely inspecting a component for certification, the method comprising:
    capturing, by a component camera of an augmented reality (AR) visualizer, a real time image of the component;
    generating an augmented reality image using the AR visualizer in real time by detecting one or more three-dimensional features of the component based on one or more visual gradients in the real time image, using the one or more 3D features as one or more reference points for orienting and aligning the non-destructive testing data in relation to the real time image, and overlaying non-destructive inspection data on the real time image such that the augmented reality image includes the non-destructive testing data oriented and aligned on the real time image based on the detected one or more 3D features;
    transmitting the AR image in real time to a remote user interface, the remote user interface disposed at a location that is remote of the AR visualizer;
    displaying, with the remote user interface, the AR image;
    remotely inspecting the component based on the AR image displayed on the remote user interface; and
    certifying the component based on said remotely inspecting the component based on the AR image displayed on the remote user interface.

* * * * *